(12) United States Patent
Kerzner et al.

(10) Patent No.: US 10,692,353 B1
(45) Date of Patent: Jun. 23, 2020

(54) TRASH MONITORING USING VIDEO ANALYTICS

(71) Applicant: Alarm.com Incorporated, Tysons, VA (US)

(72) Inventors: Daniel Todd Kerzner, McLean, VA (US); Donald Madden, Columbia, MD (US); Stephanie Hinderks, Tysons, VA (US); Allison Beach, Leesburg, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/255,381

(22) Filed: Jan. 23, 2019

Related U.S. Application Data

(60) Provisional application No. 62/620,531, filed on Jan. 23, 2018.

(51) Int. Cl.
*G08B 21/24* (2006.01)
*G06K 9/00* (2006.01)
*B65F 1/14* (2006.01)

(52) U.S. Cl.
CPC ............... *G08B 21/24* (2013.01); *B65F 1/14* (2013.01); *G06K 9/00771* (2013.01); *B65F 2210/128* (2013.01); *B65F 2210/168* (2013.01)

(58) Field of Classification Search
None
See application file for complete search history.

(56) References Cited

U.S. PATENT DOCUMENTS

| 9,520,046 | B2* | 12/2016 | Call | G08B 21/24 |
| 2015/0307273 | A1* | 10/2015 | Lyman | G01G 19/08 |
| | | | | 705/7.13 |
| 2015/0324760 | A1* | 11/2015 | Borowski | B65F 1/0006 |
| | | | | 705/308 |
| 2015/0348252 | A1* | 12/2015 | Mask | G06K 9/00201 |
| | | | | 382/103 |

* cited by examiner

*Primary Examiner* — James M Hannett
(74) *Attorney, Agent, or Firm* — Fish & Richardson P.C.

(57) ABSTRACT

Techniques are described for trash monitoring using video analytics. In some implementations, a schedule for placing trash for collection is obtained, video of a scene that includes trash when trash is placed for collection is obtained, whether the trash has been placed for collection according to the schedule is determined from the video, and in response to determining that the trash is not placed for collection according to the schedule, a notification that the trash has not been placed for collection is provided.

19 Claims, 3 Drawing Sheets

TRASH MONITORING USING VIDEO ANALYTICS

CROSS-REFERENCE TO RELATED APPLICATION

This application claims the benefit of U.S. Provisional Application No. 62/620,531, filed Jan. 23, 2018, and titled "TRASH MONITORING USING VIDEO ANALYTICS," which is incorporated by reference in its entirety.

TECHNICAL FIELD

This disclosure relates to property monitoring technology.

BACKGROUND

Many homes have trash service that pick up trash on certain days of the week. The day before trash is scheduled to be picked up from their home or a few hours before, homeowners may take out trash in a trash can and leave the trash can by the curb. Once the trash is picked up, the homeowners may then bring the trash can back from the curb.

SUMMARY

Techniques are described for trash monitoring using video analytics.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Trash may be collected from a home on a routine basis. For example, some homes may have a trash service provider that collects the trash Monday morning and Thursday morning. A trash service provider for a home may only collect trash from a particular location, e.g., by a curb in front of the home. For example, if a resident of a home forgets to leave their trash can by the curb before Monday morning, then a resident of a home may be stuck with the trash until Thursday morning. Trash that is left around a few days may quickly smell and accumulate to exceed the capacity of a trash can. Accordingly, a system that reminds a resident of a home to place trash for collection may be useful.

Additionally, even if a resident of a home remembers that trash is being picked up, the resident may not be sure whether the trash has been placed for collection. For example, another resident may typically place the trash for collection or the resident may have forgotten whether they already placed the trash for collection. A resident of a home that is able to view their curb from a window or from a front door may quickly determine under daylight whether trash has been placed by the curb for collection. However, if the curb is not within a line of sight of the window or from the front door, e.g., a very long drive way or trees blocking a view of the curb, the resident of a home may need to leave the house and walk towards the curb to check if the trash is at the curb. Additionally, even if the curb is within a line of sight of the window or from the front door, at night there may not be enough light for the resident of a home to determine whether the trash is by the curb unless the resident of a home leaves the home and walks closer to the curb.

A resident of a home may not wish to leave their home to check whether the trash is by the curb. For example, the resident may not realize they need to check until very late at night or it may be very cold outside. Accordingly, a system that monitors trash and enables a resident of a home to, without physically being present at the location trash is collected, determine whether the trash has been placed for collection may be advantageous. Additionally, the system may also let the resident know when a trash can may be returned from the curb and let the resident know whether trash was tampered with.

Figure 1:
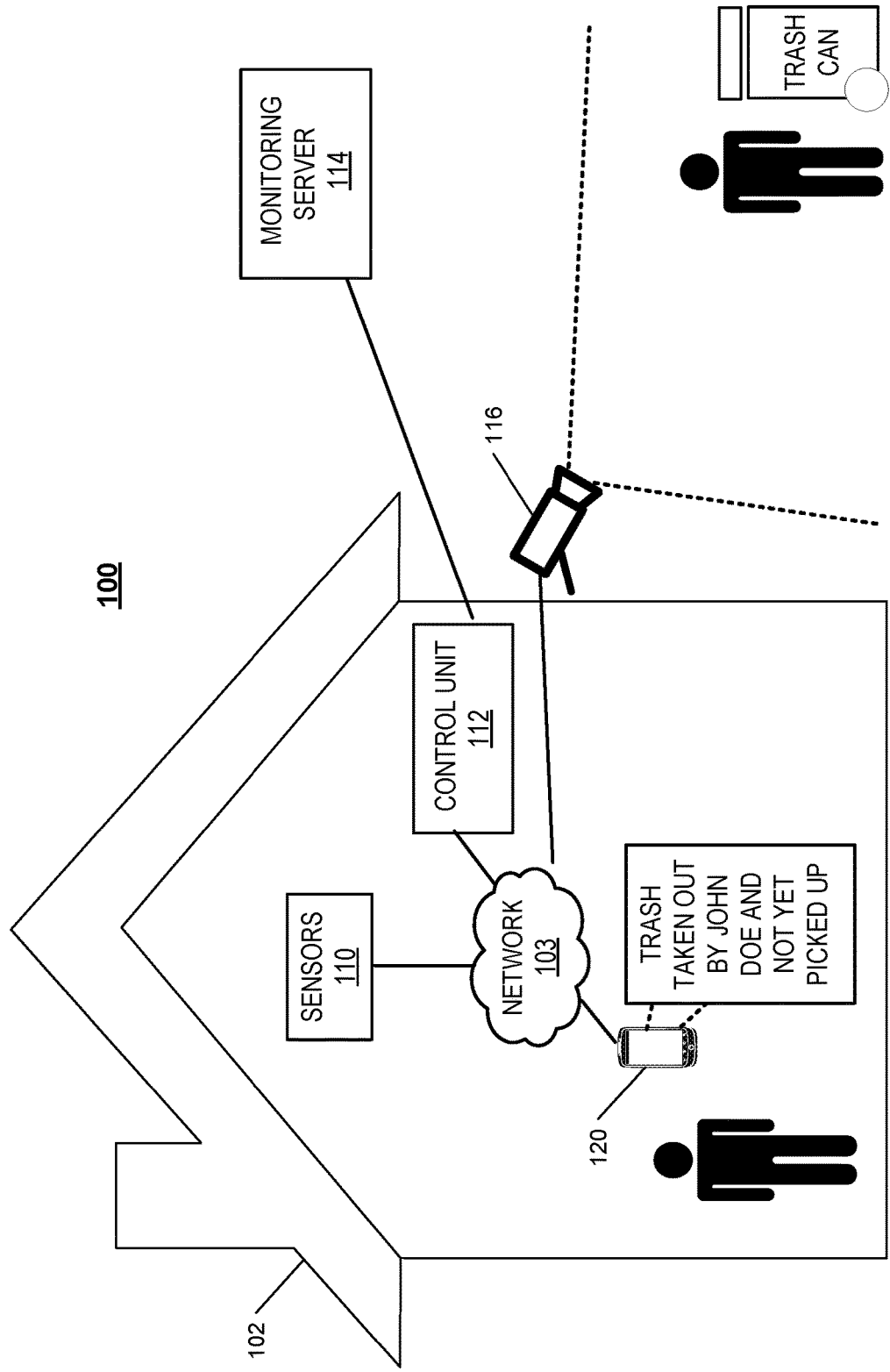
FIG. 1 illustrates an example of a system that provides trash monitoring using video analytics.

FIG. 1 illustrates an example of a system 100 that provides trash monitoring using video analytics. As shown in FIG. 1, a property 102 (e.g. a home) of a resident is monitored by an in-home monitoring system (e.g. in-home security system) that includes components that are fixed within the property 102 (components both indoors and outdoors). The monitoring system 100 may include a control unit 112, one or more sensors 110, a camera 116, a monitoring server 114, and a user device 120. The control unit 112, the one or more sensors 110, the camera 116, and the user device 120 may be in communication through a network 103.

The camera 116 may capture video of a scene that includes trash when trash for the property 102 is placed for collection. For example, the camera 116 may capture a scene including a curb where trash to be collected is left for the property 102. In another example, the camera 116 may capture a scene that does not include the curb where trash is collected but does include a portion of a driveway through which trash is transported from the property 102 to the curb.

The control unit 112 may obtain video from the camera 116 and monitor trash using the video. For example, the control unit 112 may obtain video of a scene that includes a curb outside the property 102 from which a trash service collects trash. The control unit 112 may determine trash has been placed at a location from which trash is collected by visually recognizing trash in the video. For example, the control unit 112 may recognize when a trash can or trash bag appears in the video from the camera 116.

The control unit 112 may visually recognize trash based on a variety of ways. In one way, the control unit 112 may obtain information that indicates a location of the property 102, and from that location, determine an appearance of a trash can for that location. For example, the control unit 112 may obtain an address of the property 102, determine a trash service provider that provides trash service to the address, then determine an appearance of a trash can used by the trash service provider, and then determine when an object with the determined appearance of the trash can appears in the video.

In another way, the control unit 112 may track a resident taking out trash for a number of days and learn to recognize how the trash appears from the video. For example the control unit 112 may determine that a resident has taken out a green rectangular object on Sunday and Wednesday afternoons and then returned the object the next morning for two weeks and, in response, prompt the user to request that the user confirm whether the green rectangular object is a trash can for the property 102. In yet another way, the control unit 112 may prompt a user to select a trash can that is most similar to the trash can used for the property 102. For example, the control unit 112 may provide an interface on the user device 120 through which a user may select a color and a shape of a trash can used for the property 102. In yet another way, the control unit 112 may obtain one or more images of a trash can and learn to recognize the trash can from the images. For example, the system 100 may provide a prompt to the user device 120 requesting that a user take one or more photos of a trash can for the property 102 and the control unit 112 may then obtain photos of the trash can captured by the user device 120. In another way, the system 100 may provide a prompt on the user device 120 that requests that the user select a trash can in a video captured by the camera 116. The control unit 112 may then determine the appearance of the trash can from the user's selection of the trash can in the video.

In still another way, the control unit 112 may be configured to recognize a particular sticker as indicating trash and that sticker may be then placed on a trash can. For example, a control unit 112 may easily distinguish a highly reflective sticker with a distinct shape or pattern and may be configured to associate that sticker with trash. A resident may then place that sticker on their trash can so that the control unit 112 may more easily recognize trash in the video, for example, the sticker may be still by visible when it is dark or raining when the rest of the trash can is not visible. In another way, the control unit 112 may recognize the trash based on recognizing particular text on a trash can. For example, the control unit 112 may perform optical character recognition and when recognizing the word "Trash" on an object, determine that the object is trash.

In addition to recognizing an appearance of trash, the control unit 112 may determine trash has been placed at a location from which trash is collected by determining a location where trash is collected for the property 102. For example, the control unit 112 may determine that trash is collected from a portion of curb that appear immediately to the right of the driveway when viewing away from the property 102 towards the curb.

The control unit 112 may determine the location that trash is collected for the property 102 in various ways. In one way, the control unit 112 may perform a visual segmentation on video of the scene and attempt to identify a location that trash is left. For example, the control unit 112 may determine that vehicles travel along a dark portion of the video, a trash can has been left by a user along a lighter narrow portion bordering the dark portion, determine from the vehicles that the dark portion is a road so the light narrow portion is a curb, and, in response, determine that portion of the curb where the trash can is left is where trash to be collected is left for the property 102.

In another way, the control unit 112 may visually segment a frame of the video based on shapes within the frame and then prompt the user to indicate a location within the frame that corresponds to where trash is collected for the property 102. For example, the control unit 112 may present on the user device 120 a frame of the video that shows portions of the frames that appear to be different objects and ask the user to identify the object or a portion within the frame that corresponds to a location at which the trash is collected.

In some implementations, the control unit 112 may determine that trash has been placed at a location from which trash is collected by a combination of visually recognizing trash in the video and visually recognizing a location at which trash is typically placed. For example, the control unit 112 may initially determine an appearance of a trash can, from the appearance of the trash can then determine where trash is typically left, then determine when a trash bag that is not in the trash can is left where trash is typically left and, in response, determine that trash has been placed at the location from which trash is collected even if the trash can is not placed at the location.

After the control unit 112 is able to recognize trash and where trash should be placed for collection, the control unit 112 may then indicate whether trash has been placed for collection. For example, the control unit 112 may provide an interface on the user device 120 through which a resident may determine trash is currently placed at the location that trash is collected for the property 102. Accordingly, the resident may quickly determine whether trash has been placed for collection without looking or going outside.

The control unit 112 may obtain a schedule for placing trash for collection. For example, the control unit 112 may obtain a schedule that indicates trash should be placed for collection on Sunday evening and Wednesday evening. The control unit 112 may obtain the schedule for placing trash for collection in a number of ways. In one way, the control unit 112 may obtain a schedule of trash collection from a website of a trash service provider. For example, the control unit 112 may determine an address of the property 102, determine the trash service provider that provides service to that property 102, and then obtain a trash collection schedule from a website of the trash service provider. In another way, the control unit 112 may obtain a schedule of trash collection from learning when trash is placed for collection for the property 102. For example, the control unit 112 may monitor the video to learn the days of the week and times that the trash is placed for collection. In still another way, the control unit 112 may have the schedule input by a resident. For example, the control unit 112 may provide a user interface on the user device 120 through which a resident may specify that days of the week and times that the trash is collected.

Additionally or alternatively, the control unit 112 may obtain a schedule for placing trash for collection by detecting in video captured by the camera 116 that trash cans from nearby properties are visible. For example, the control unit 112 may assume that when trash cans for neighbors appear then trash should be placed for collection. In another way, the control unit 112 may recognize a garbage truck in video captured by the camera 116 and determine the schedule for placing trash to correspond to when the garbage truck appears in the video.

In some implementations, the control unit 112 may additionally provide reminders to place trash for collection based on the schedule for trash collection. For example, the control unit 112 may determine when trash has not been placed for collection when it is an hour, two hours, or some other amount of time, after the typical time that the trash is placed for collection and, in response, send a notification to the user device 120 to notify a resident that the trash has not been placed for collection. Accordingly, a resident that has forgotten to take out the trash may be reminded to take out the trash.

The control unit 112 may provide reminders to place trash for collection in a number of ways. For example, the control unit 112 may use the one or more sensors 110 to determine which residents of the property 102 are home and only send reminders to all the residents currently at the property 102. In another example, the control unit 112 may instead announce on a speaker within the home "Reminder, trash pickup is tomorrow morning."

In some implementations, the control unit 112 may alternatively or additionally indicate when trash has been picked up so that a resident knows that they can return the trash can from the location that trash is collected. For example, similarly to how the control unit 112 may notify various residents to place the trash for collection, the control unit 112 may notify various residents that the trash is collected. The control unit 112 may determine that the trash is collected through analyzing video of the location that the trash is collected from and determining whether a trash service provider has interacted with the trash can. For example, the control unit 112 may determine from the video that a garbage truck of their trash service provider arrived and the trash can was emptied into the garbage truck. Additionally, an indication by the control unit 112 whether the trash has been emptied may also indicate to a user whether the user can still add additional trash to be collected as the trash already taken out has not yet been collected or whether the user should wait to take out trash until shortly before the next time trash is collected.

Additionally, the control unit 112 may determine whether the trash has been disturbed. For example, the control unit 112 may track the movement of people in video and determine that a person that is not from a garbage truck of the trash service provider and not from the property 102 has walked up from the street to the trash can and interacted with the trash placed for collection and, in response, provide a notification to various residents that the trash has been tampered with and provide a portion of the video corresponding to the interaction. In another example, the control unit 112 may determine from the video that an animal, e.g., a bear, a raccoon, or some other animal, disturbed the trash while it was placed for collection and, in response, provide a notification. In yet another example, the control unit 112 may determine from the video that the trash has tipped over or been blown and, in response, provide a notification. Additionally or alternatively, the control unit 112 may determine from a video that trash has been left unsecured and, in response, provide a notification.

The user device 120 may be a mobile device such as a smart phone, a tablet, or a laptop computer, a desktop computer, or some other type of computing device used by a person. The one or more sensors 110 may be cameras that may be used to facially recognize persons within the property 102 or sensors able to identify user devices within the property 102. The monitoring server 114 may be configured to perform the functionality performed by the control unit 112 in regards to trash monitoring or in combination. For example, the monitoring server 114 may obtain the video from the camera 116 through the control unit 112 and determine whether trash has been placed for collection. In another alternative example, the control unit 112 may indicate to the monitoring server 114 that a reminder should be sent to place trash for collection and the monitoring server 114 may then determine what type of reminder to send to various residents of the property 102.

In some implementations, the system 100 may also use facial recognition. For example, the control unit 112 may perform facial recognition on the video from the camera 116 and keep a log of who placed the trash for collection on which days and what times. In some implementations, the system 100 may determine a pattern of which residents place the trash and when determining that trash has not been placed for collection, only provide a notification to a user device of the resident that typically places the trash for that day and time.

In some implementations, the system 100 may keep a log of trash events. For example, the control unit 112 may generate a log that indicates times and dates and corresponding thumbnails from video for when trash is placed for collection, when trash is collected, when trash is tampered with, and when a trash can is returned.

In some implementations, the system 100 may determine when other similar systems for other properties determine that trash has been collected and determine an exact time when trash is expected that day to be picked up from the property 102. Accordingly, a resident may be able to quickly determine from the system 100 whether the resident still has time to place the trash for collection.

In some implementations, the system 100 may distinguish between trash and other types of objects that are collected. For example, the system 100 may distinguish between recycling, yard waste, and trash and separately determine a schedule and provide notifications for recycling and yard waste similarly as described above for trash.

In some implementations, the system 100 may similarly provide notifications that a trash can has not been returned from trash collection. For example, the system 100 may determine from video that a trash can is still where trash is placed for collection two hours after the video showed the trash was collected and, in response, determine to provide a notification to return the trash can. In another example, the system 100 may determine that an action of returning a trash can has not occurred within two hours after trash was scheduled to be collected as a trash can has not been seen in video of a driveway and, in response, provide a provide a notification to return the trash can. The notifications for returning a trash can may be provided to users within the property 102 and if no users are determined to be present, then to users outside the property 102.

Figure 2:
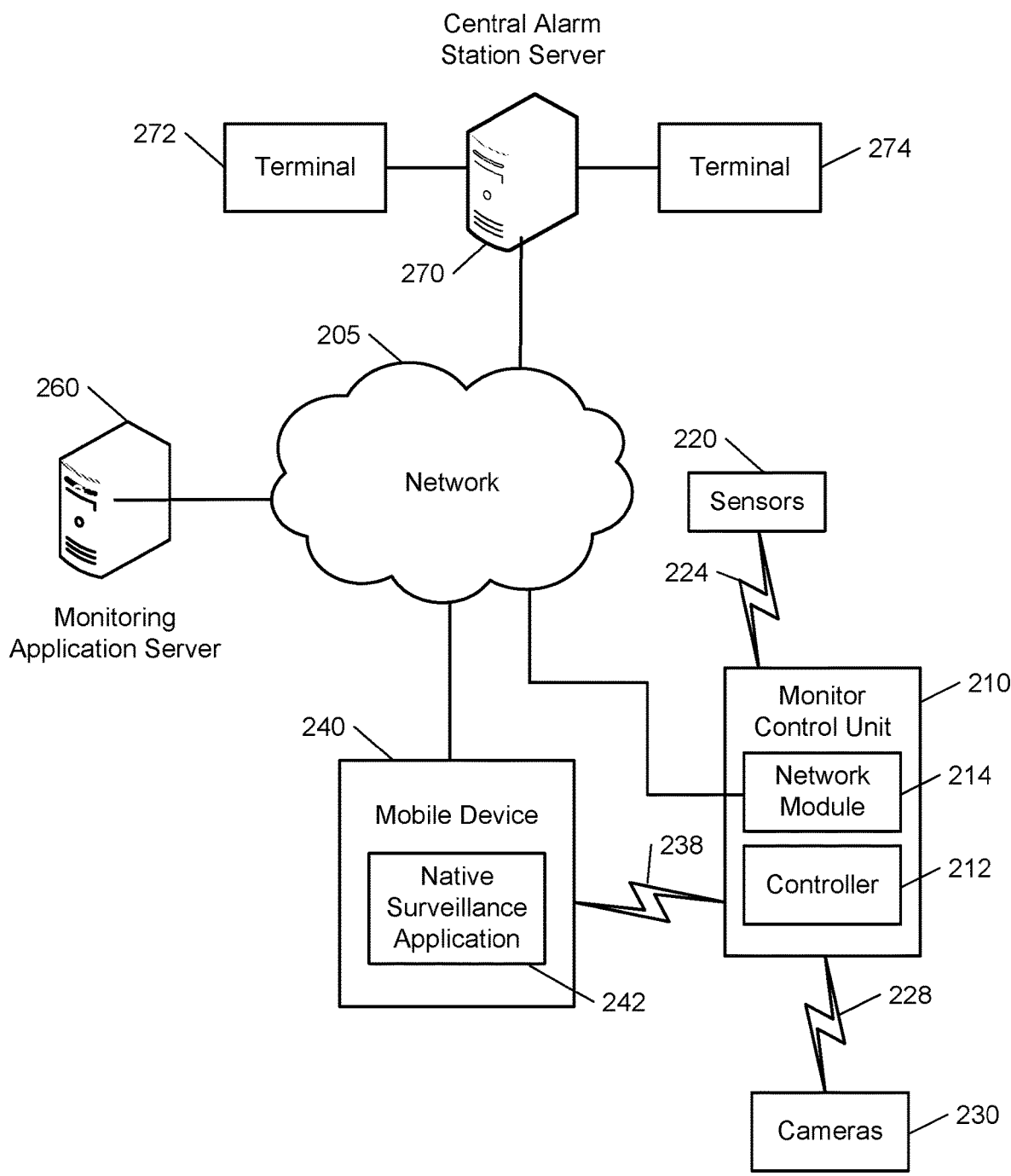
FIG. 2 illustrates another example of a monitoring system that provides trash monitoring using video analytics.

FIG. 2 illustrates an example of a system 200 that provides trash monitoring using video analytics. The system 200 includes a network 205, a monitor control unit 210, one or more user devices 240, and a monitoring application server 260. The network 205 facilitates communications between the monitor control unit 210, the one or more user devices 240, and the monitoring application server 260. The network 205 is configured to enable exchange of electronic communications between devices connected to the network 205. For example, the network 205 may be configured to enable exchange of electronic communications between the monitor control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitor control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitor control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system may also include one or more other cameras 230. Each of the one or more cameras 230 may be video/photographic cameras or other type of optical sensing device configured to capture images. For instance, the cameras may be configured to capture images of an area within a building monitored by the monitor control unit 210. The cameras may be configured to capture single, static images of the area and also video images of the area in which multiple images of the area are captured at a relatively high frequency (e.g., thirty images per second). The cameras may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The cameras 230 may include a camera that is similar to camera 116, the sensors 220 may include sensors that are similar to sensors 110, the mobile device 240 may be similar to the user device 120, and the network 205 may be similar to network 103.

The sensors 220 and the cameras 230 communicate with the controller 212 over communication links 224, 226, and 228. The communication links 224, 226, and 228 may be a wired or wireless data pathway configured to transmit signals from the sensors 220, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitor control unit 210 to receive information regarding events (e.g., alarm events) detected by the monitor control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitor control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitor control unit 210 and perform the functions of the monitor control unit 210 for local monitoring and long range/offsite communication. Other arrangements and distribution of processing is possible and contemplated within the present disclosure.

Figure 3:
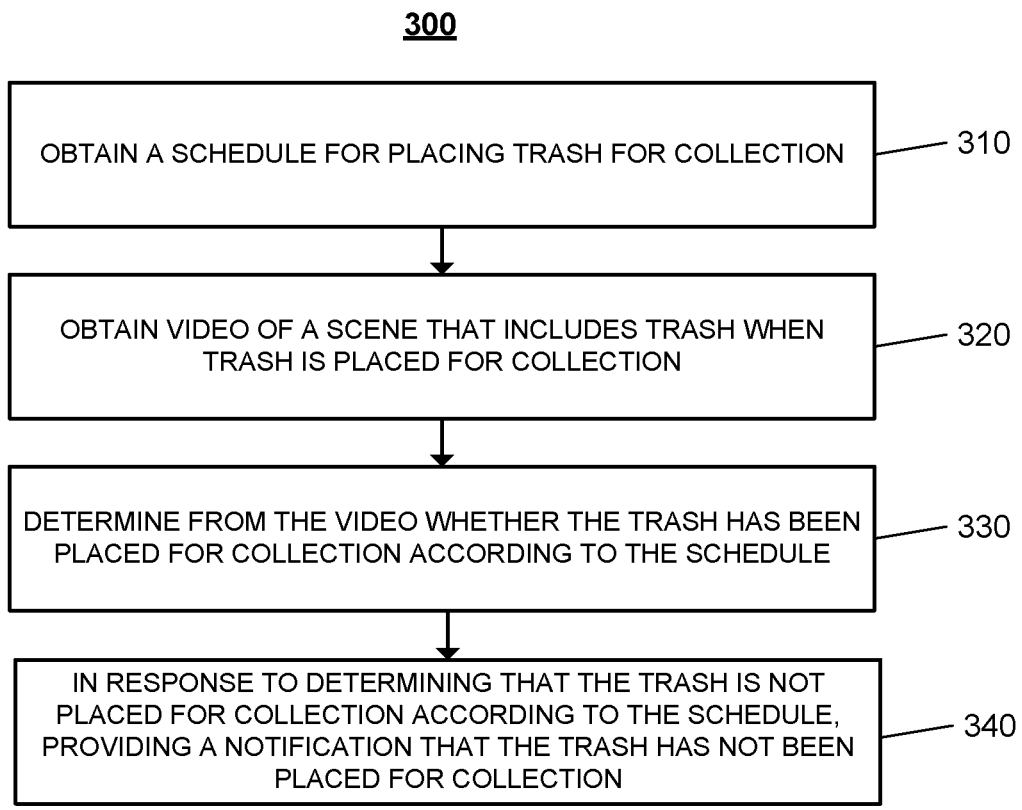
FIG. 3 is a flow chart of an example process for trash monitoring using video analytics.

FIG. 3 illustrates an example process 300 for trash monitoring using video analytics. Process 300 can be implemented using system 100 described above. Thus, descriptions of process 300 may reference one or more of the above-mentioned components, modules, or computational devices of system 100. In some implementations, described actions of process 300 are enabled by computing logic or software instructions executable by a processor and memory of an example electronic device.

The process 300 includes obtaining a schedule for placing trash for collection (310).

In some implementations, obtaining a schedule for placing trash for collection includes obtaining the schedule from a web site of a trash provider. For example, the control unit 112 may obtain an address of the property 102, identify a trash service provider that provides service to the address, and then obtain a schedule that indicates trash is picked up on Thursday mornings for the address from the trash service provider's website. In some implementations, obtaining a schedule for placing trash for collection includes determining the schedule for placing trash for collection based on video of the scene that shows when trash was previously placed for collection. For example, the control unit 112 may learn from video from the camera 116 that trash is placed for collection at 7 PM on Wednesday nights. In some implementations, obtaining a schedule for placing trash for collection includes receiving input from a user that specifies days of the week and times that trash is collected. For example, the control unit 112 may receive input from that user through a graphical user interface in which the user has checked the days and times that trash is collected.

The process 300 includes obtaining video of a scene that includes trash when trash is placed for collection (320). For example, the control unit 112 may obtain video in real-time from the camera 116 that shows a curb where trash is placed for collection.

The process 300 includes determining from the video whether the trash has been placed for collection according to the schedule (330). For example, the control unit 112 may determine that trash has not been placed for collection at 8 PM on Wednesday night when according to the schedule, trash is placed for collection at 7 PM on Wednesday night. In some implementations, determining from the video whether the trash has been placed for collection according to the schedule includes determining from the video that trash has not been placed for collection by a particular time a day before the schedule indicates the trash will be collected. In some implementations, determining from the video whether the trash has been placed for collection according to the schedule includes identifying a location in the scene that trash is placed for collection and determining that trash has not been placed at the location in the scene. For example, the control unit 112 may determine, from video captured previously, the location in the scene that trash is typically placed for collection and then determine whether trash is placed at that location in the future.

In some implementations, determining from the video whether the trash has been placed for collection according to the schedule includes determining an appearance of a trash can and determining that the trash can does not appear in the video of the scene. For example, the control unit 112 may determine that the trash can is green and rectangular and then determine later the trash can does not appear in the video as a green and rectangular object that matches the appearance of the trash can does not appear in the video.

In some implementations, determining from the video whether the trash has been placed for collection according to the schedule includes determining whether the action of trash being taken out has occurred based on video. For example, the control unit 112 may determine from video that a user has been seen rolling a trash can through a driveway or a yard and, in response, determine that the action of trash being taken out has occurred so the trash has been placed for collection even if the control unit 112 does not receive any video of where the trash is placed for collection.

The process 300 includes in response to determining from the video the trash has not been placed for collection according to the schedule, providing a notification that the trash has not been placed for collection (340). In some implementations, in response to determining that the trash is not placed for collection according to the schedule, providing a notification that the trash has not been placed for collection includes providing audio for a speaker that indicates that the trash will be collected. For example, the control unit 112 may provide audio of synthesized speech saying "Reminder, trash is being picked up tomorrow." In some implementations, in response to determining that the trash is not placed for collection according to the schedule, providing a notification that the trash has not been placed for collection includes providing, to a computing device, text that indicates that the trash will be collected. For example, the control unit 112 may send a message that includes the text "Reminder, trash is being picked up tomorrow."

In some implementations, providing, to a computing device, text that indicates that the trash will be collected includes determining that a particular computing device is located within a property and in response to determining that the particular computing device is located within the property, providing the text that indicates the trash will be collected to the particular computing device. For example, the control unit 112 may identify all user devices within the property 102 and then send a text message or a notification through respective native surveillance applications installed on each of the user devices that reminds the users that trash is collected the next morning and that the trash has not been placed for collection.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining a schedule for placing trash for collection;
   obtaining video of a scene that includes trash when trash is placed for collection;
   determining from the video whether the trash has been placed for collection according to the schedule;
   in response to determining that the trash is not placed for collection according to the schedule, determining whether a particular computing device is located within a property; and
   in response to determining that the particular computing device is located within the property, providing a notification that the trash has not been placed for collection to the particular computing device.

2. The method of claim 1, wherein determining from the video whether the trash has been placed for collection according to the schedule comprises:
   determining from the video that trash has not been placed for collection by a particular time a day before the schedule indicates the trash will be collected.

3. The method of claim 1, wherein determining from the video whether the trash has been placed for collection according to the schedule comprises:
   identifying a location in the scene that trash is placed for collection; and
   determining that trash has not been placed at the location in the scene.

4. The method of claim 1, wherein determining from the video whether the trash has been placed for collection according to the schedule comprises:
   determining an appearance of a trash can; and
   determining that the trash can does not appear in the video of the scene.

5. The method of claim 1, wherein determining from the video whether the trash has been placed for collection according to the schedule comprises:
   determining an appearance of a trash can from the video; and
   determining the action of trash being taken out has not occurred based on the appearance of the trash can.

6. The method of claim 1, wherein obtaining a schedule for placing trash for collection comprises:

determining the schedule for placing trash for collection based on video of the scene that shows when trash was previously placed for collection.

7. The method of claim 1, wherein obtaining a schedule for placing trash for collection comprises:
obtaining the schedule from a website of a trash provider.

8. The method of claim 1, wherein obtaining a schedule for placing trash for collection comprises:
receiving input from a user that specifies days of the week and times that trash is collected.

9. The method of claim 1, wherein providing a notification that the trash has not been placed for collection comprises:
providing audio for a speaker that indicates that the trash will be collected.

10. The method of claim 1, wherein providing a notification that the trash has not been placed for collection comprises:
providing, to a computing device, text that indicates that the trash will be collected.

11. The method of claim 1, comprising:
determining that a trash can has not been returned from trash collection based on the video; and
providing a notification that the trash can has not been returned from trash collection.

12. A system comprising:
one or more computers and one or more storage devices storing instructions that are operable, when executed by the one or more computers, to cause the one or more computers to perform operations comprising:
obtaining a schedule for placing trash for collection;
obtaining video of a scene that includes trash when trash is placed for collection;
determining from the video whether the trash has been placed for collection according to the schedule;
in response to determining that the trash is not placed for collection according to the schedule, determining whether a particular computing device is located within a property; and
in response to determining that the particular computing device is located within the property, providing a notification that the trash has not been placed for collection to the particular computing device.

13. The system of claim 12, wherein determining from the video whether the trash has been placed for collection according to the schedule comprises:
determining from the video that trash has not been placed for collection by a particular time a day before the schedule indicates the trash will be collected.

14. The system of claim 12, wherein determining from the video whether the trash has been placed for collection according to the schedule comprises:
identifying a location in the scene that trash is placed for collection; and
determining that trash has not been placed at the location in the scene.

15. The system of claim 12, wherein determining from the video whether the trash has been placed for collection according to the schedule comprises:
determining an appearance of a trash can; and
determining that the trash can does not appear in the video of the scene.

16. The system of claim 12, wherein obtaining a schedule for placing trash for collection comprises:
determining the schedule for placing trash for collection based on video of the scene that shows when trash was previously placed for collection.

17. The system of claim 12, wherein obtaining a schedule for placing trash for collection comprises:
obtaining the schedule from a website of a trash provider.

18. A non-transitory computer-readable medium storing software comprising instructions executable by one or more computers which, upon such execution, cause the one or more computers to perform operations comprising:
obtaining a schedule for placing trash for collection;
obtaining video of a scene that includes trash when trash is placed for collection;
determining from the video whether the trash has been placed for collection according to the schedule;
in response to determining that the trash is not placed for collection according to the schedule, determining whether a particular computing device is located within a property; and
in response to determining that the particular computing device is located within the property, providing a notification that the trash has not been placed for collection to the particular computing device.

19. The method of claim 1, wherein determining from the video whether the trash has been placed for collection according to the schedule comprises:
identifying a curb in the video; and
determining whether trash has been placed near the curb that was identified in the video.

* * * * *